United States Patent Office

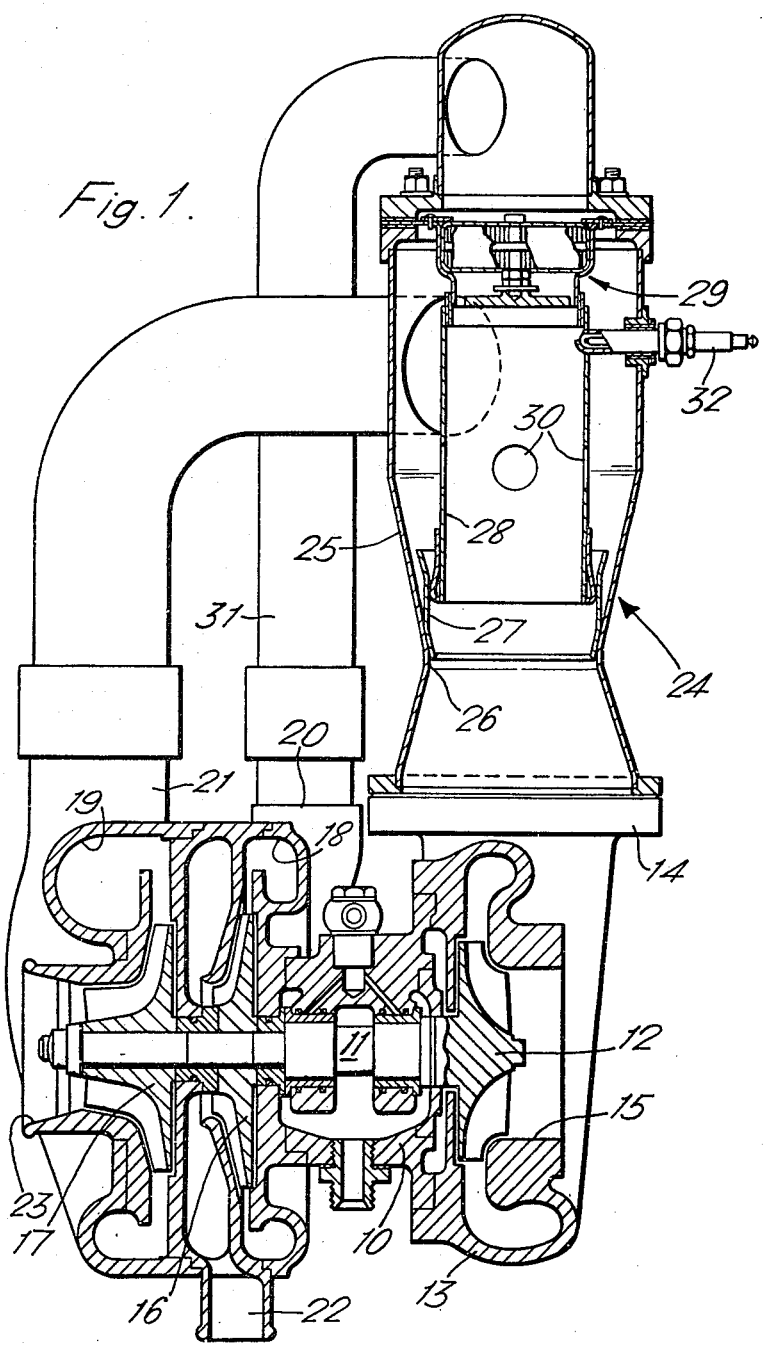

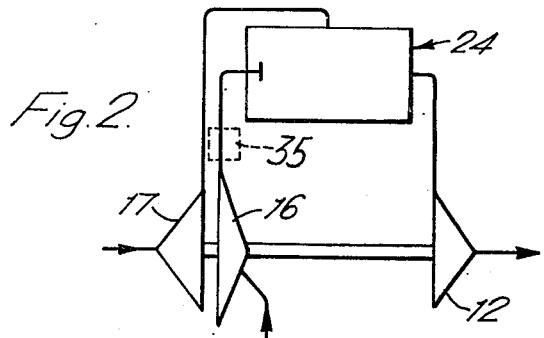
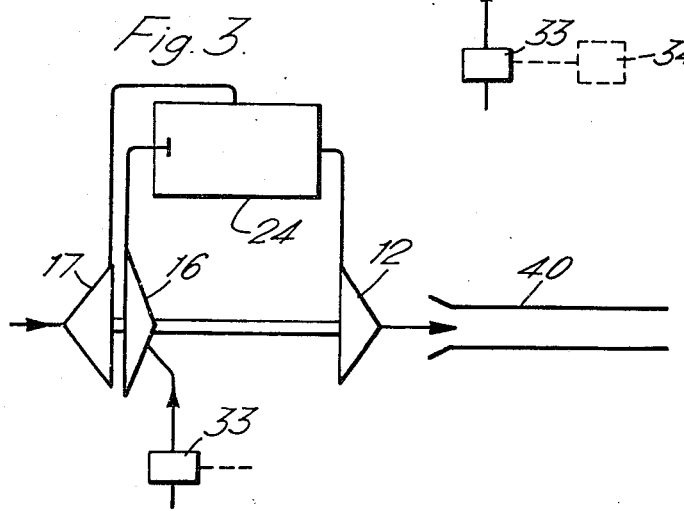
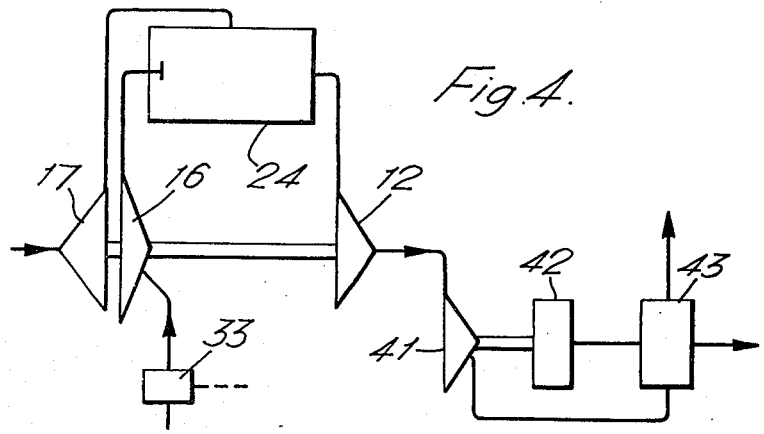

3,498,593
Patented Mar. 3, 1970

3,498,593
HOT GAS GENERATORS
Eric Kellett, London, and Kenneth Eric Tilsed, Uxbridge, England, assignors to C.A.V. Limited, London, England, a British company
Filed Apr. 12, 1968, Ser. No. 720,850
Claims priority, application Great Britain, Apr. 27, 1967, 19,438/67; June 27, 1967, 29,595/67; Sept. 22, 1967, 43,233/67; Dec. 15, 1967, 57,046/67; Jan. 19, 1968, 2,993/68
Int. Cl. F23I 9/04
U.S. Cl. 263—19     6 Claims

ABSTRACT OF THE DISCLOSURE

A hot gas generator comprising in combination, a combustion chamber, a turbine driven by heated gases leaving the combustion chamber, first and second compressors respectively driven by the turbine an air/fuel mixture burner disposed within the combustion chamber the first compressors serving to supply the fuel air mixture to the burner and the second compressor serving to supply dilution fluid to the combustion chamber and means for mixing fuel with the air flowing to said first compressor.

---

Figure 5:
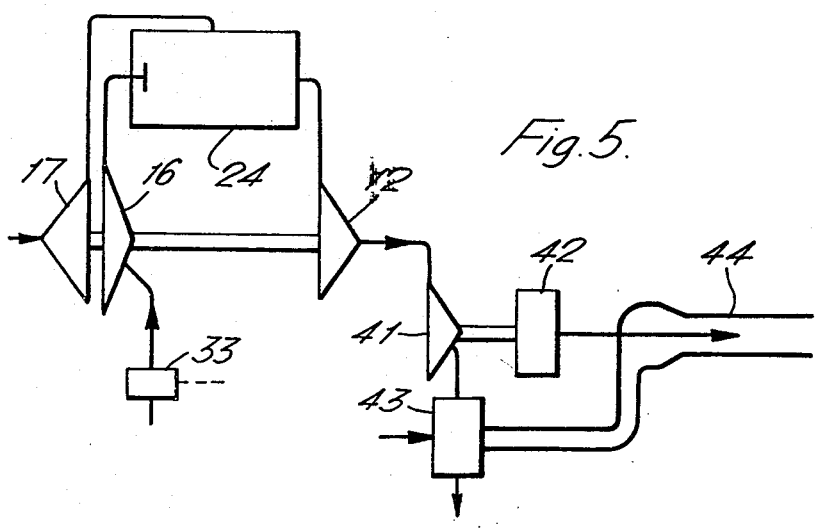

This invention relates to hot gas generators for producing large volumes of heated gas. Heated gas is widely used for drying out new buildings, drying crops after they have been cut and drying of particulate materials such as foundry sand. These are but a few examples of very many applications and in addition provided the heated gas is non toxic, the generators may be used to provide space heating of large buildings.

Hot gas generators are known in which fuel is delivered into a combustion chamber at a comparatively low pressure thereby yielding a comparatively low mass flow of heated gas. Such generators usually incorporate an electric motor which drives a fan for propelling the combustion air and heated gas and in addition in the case where liquid fuel is being burnt, the motor also drives a fuel pump which draws fuel from a convenient fuel tank and delivers it to a burner. Such generators in order to produce large quantities of heated gas must be physically large and the result is that they can generally only be applied in permanent installations for crop drying and space heating.

In some instances however the low heated gas output may be acceptable so that the generators can be made sufficiently small to be portable. In these cases however it is still necessary to provide power for the motor and this power may not be readily available on a building site so that some form of prime mover must be provided such for instance as a reciprocating piston internal combustion engine.

In an attempt to increase the volume of heated gas produced for a given size of unit and also to avoid the necessity of providing external sources of motive power, small gas turbine engines have been used. These are very efficient and can burn fuel at a high rate. Unfortunately a conventional gas turbine is very expensive and includes a complicated fuel system. In conventional gas turbines the fuel system delivers the liquid fuel to the combustion chamber at a high pressure and includes expensive control equipment to insure that the engine does not operate outside its design limits. Furthermore, the fuel system contains delicate parts which can easily be damaged if proper maintenance of the engine is not carried out.

As a result of the high cost of the small gas turbine its use has been limited to certain special applications. Portable heat generators as opposed to hot gas generators are known and these make use of liquified petroleum gas. These generators are widely used in situations where a hot gas generator would be more appropriate.

The object of the invention is therefore to provide a portable hot gas generator which is capable of delivering large volumes of heated gas and which employs a simple and robust fuel system.

According to the invention a hot gas generator comprises in combination, a combustion chamber, a turbine driven by gases leaving the combustion chamber, first and second compressors driven by the turbine, an air/fuel mixture burner positioned in the combustion chamber, said first compressor serving to supply combustion air to the burner and the second compressor serving to supply dilution fluid to the combustion chamber, and means for mixing fuel with the air flowing to the burner.

In the accompanying drawings:

FIGURE 1 is a sectional side elevation of one example of a hot gas generator in accordance with the invention, FIGURE 2 is a diagrammatic representation of the generator of FIGURE 1, and FIGURES 3, 4, 5, and 6 are views similar to FIGURE 2 showing modifications.

Referring to FIGURES 1 and 2 of the drawings there is provided a body part 10 in which is mounted a rotary shaft 11. At one end of the shaft is mounted a radial flow turbine rotor 12 which is accommodated within a turbine casing 13 having a tangential inlet 14 and an axially extending outlet 15. The turbine casing is secured to the body part 10.

At the other end of the shaft is mounted a pair of radial flow compressor rotors 16 and 17 disposed in compressor casings 18 and 19 respectively. The compressor defined by the rotor 16 and casing 18 is hereinafter called the first compressor whilst the compressor defined by the rotor 17 and casing 19 is hereinafter called the second compressor. The casings 18 and 19 have tangential outlets 20 and 21 respectively and inlets 22, 23 respectively.

Also provided is a combustion chamber indicated at 24. This includes an outer casing 25 which is of generally cylindrical form and having a throat portion 26. The downstream end of the combustion chamber is secured to the inlet 14 of the turbine and upstream of the throat portion is an annular carrier 27 which serves to support the downstream end of a flame tube 28. The upstream end of the flame tube is supported by a burner assembly 29 secured to the upstream end of the outer casing. Surrounding the flame tube is an annular space to which dilution air is fed by the second compressor through a pipe 29 and formed in the flame tube are holes 30 through which dilution air flows into the flame tube. Furthermore, the burner assembly 29 is in communication with the outlet 20 of the first compressor by way of a pipe 31.

Also mounted on the casing 25 is an ignition plug 32 which extends into the flame tube downstream of the burner assembly 29 so as to ignite the air/fuel mixture entering the combustion chamber.

In order to entrain fuel with the air entering the first compressor a carburettor indicated at 33 in FIGURE 2 is provided. The carburettor is supplied with fuel from a source 34. When liquid fuel is employed a conventional fuel carburettor having a venturi may be provided in order to draw the fuel into the air stream. Where a gaseous fuel is used such for instance as town gas, natural gas or vapourized petroleum gas, the gas will be supplied under a slight pressure to the nozzle of the carburettor so that the latter is little more than a mixing device for the air and gas.

In operation, the heated gases leaving the combustion chamber drive the turbine rotor prior to being discharged through ducting or the like. The turbine rotor in turn drives the compressor rotors which supply the air/fuel mixture and the dilution air to the combustion chamber. The dilution air acts to reduce the temperature of the gases entering the turbine so that the safe working temperature thereof is not exceeded.

Furthermore, it will be noted from FIGURE 1 of the drawings that the compressor rotors 16 and 17 are of differing diameters and widths. The rotor 16 of the first compressor is larger in diameter and has a smaller axial width than that of the rotor 17 so that the output pressure of the first compressor is slightly larger than that of the second compressor. The reduced axial width means that the volume of air/fuel mixture delivered is less. By supplying the air/fuel mixture at slightly higher pressure, penetration of the air/fuel mixture into the combustion chamber is ensured and once the combustion process has started the apparatus is self sustaining as long as fuel is supplied thereto. The relative sizes of the two compressors are such that their performance are compatible at all operating conditions. Furthermore, the speed of rotation is dependent upon the amount of fuel entrained in the air passing through the first compressor.

The ratio of fuel to air automatically remains substantially constant throughout the operating range of the apparatus and the speed of operation and hence the amount of heated gas produced is determined by the amount of fuel supplied. In the case where fuel under pressure is supplied to the generator the control of fuel quantity may be by means of a valve which controls the flow of fuel to the first compressor.

The carburettor 33 in FIGURE 2 is upstream of the compressor but by using a pressurized carburettor it can be positioned downstream of the compressor as indicated at 35.

The arrangement shown in FIGURE 3 is for use where large quantities of heated gas are required. In this arrangement an ejector 40 is provided and into which the heated gas leaving the turbine passes. The construction of the ejector ensures that atmospheric air is mixed with the heated gases leaving the turbine thereby lowering the temperature to give a larger volume of relatively cool gas. In this case as in the previous case the heated gas contains the products of combustion of the fuel.

Figure 6:
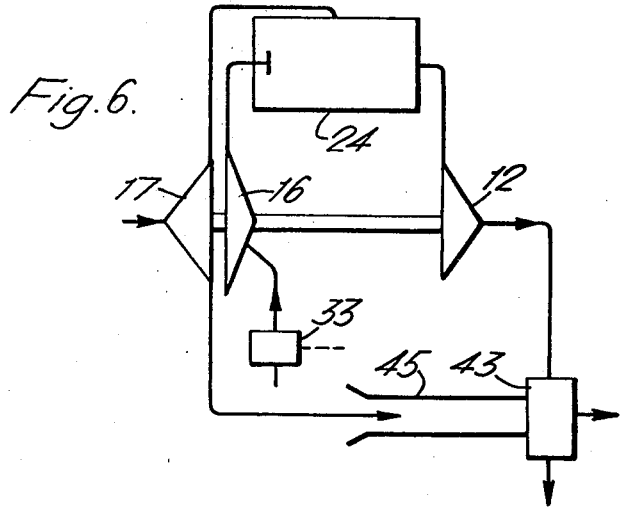

The arrangement shown in FIGURE 4 is for producing clean gas which is free from the products of combustion. The heated gases from the turbine are passed to a second turbine 41 which in turn drives an axial flow compressor 42 which delivers clean air to a heat exchanger 43. The heat exchange elements of the heat exchanger are heated by the heated gases leaving the turbine 41 prior to the heated gases being discharged at some suitable point. In the arrangement of FIGURE 5 the axial flow compressor supplies motive air to an ejector 44 and this motive air entrains heated air which has been heated in the heat exchanger 43. In the arrangement of FIGURE 6 the heat exchanger 43 is fed directly with the hot exhaust gases leaving the turbine rotor 12. Moreover, the second compressor is enlarged and is provided with a tapping by which motive air is passed to an ejector 45. The motive air entrains further air from the atmosphere and this mixture is passed through the heat exchanger 43.

In each of the above alternative arrangements the basic unit described with reference to FIGURES 1 and 2 is used to supply the original source of heated gas.

Having thus described our invention what we claim as new and desire to secure by Letters Patent is:

1. A hot gas generator comprising in combination, a combustion chamber, a turbine driven by heated gases leaving the combustion chamber, first and second compressors driven by the turbine, an air/fuel mixture burner positioned in the combustion chamber, said first compressor serving to supply combustion air to the burner and the second compressor serving to supply dilution fluid to the combustion chamber and a carburettor for mixing fuel with air flowing to the burner.

2. A hot gas generator as claimed in claim 1 including means for controlling the flow of fuel to the burner.

3. A hot gas generator as claimed in claim 2 in which said means controls the quantity of air/fuel mixture passing through the first compressor.

4. A hot gas generator as claimed in claim 1 including an ejector, means for directing the heated gas leaving the turbine to said ejector, said ejector serving to entrain atmospheric air with said heated gases thereby to provide a large volume of relatively cooler heated gas.

5. A hot gas generator as claimed in claim 1 including a further turbine driven by the heated gases leaving the first mentioned turbine, a further compressor driven by said further turbine, a heat exchanger which receives the heated gases leaving said further turbine and which effects heat exchange with the air pumped by said further compressor.

6. A hot gas generator as claimed in claim 1 including a heat exchanger which receives heated gases leaving said turbine and an ejector for delivering air to said heat exchanger said ejector receiving motive air from said second compressor.

References Cited

UNITED STATES PATENTS

| | | | |
|---|---|---|---|
| 1,191,235 | 7/1916 | Richter | 60—39.65 |
| 2,758,827 | 8/1956 | Pfenninger. | |
| 3,241,316 | 3/1966 | Endres | 60—39.5 |
| 3,304,074 | 2/1967 | Atherton | 263—19 |

EDWARD G. FAVORS, Primary Examiner

U.S. Cl. X.R.

60—39.27